(12) United States Patent
Kaufthal et al.

(10) Patent No.: US 12,277,305 B2
(45) Date of Patent: *Apr. 15, 2025

(54) INTERACTIVE USER INTERFACE CONTROLS FOR SHARED DYNAMIC OBJECTS

(71) Applicant: Microsoft Technology Licensing, LLC, Redmond, WA (US)

(72) Inventors: Jonathan Seth Kaufthal, Seattle, WA (US); Nathan Darrel Kile, Jr., Mercer Island, WA (US); Azin Zohdi, Vancouver (CA); Jenna Rose Ammerall, Redmond, WA (US); Nicolas Gunnar Alexander Nuzzaci, Bellevue, WA (US); Maya Rodrig, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/455,855

(22) Filed: Aug. 25, 2023

(65) Prior Publication Data

US 2023/0400969 A1 Dec. 14, 2023

Related U.S. Application Data

(63) Continuation of application No. 17/674,625, filed on Feb. 17, 2022, now Pat. No. 11,775,149.

(Continued)

(51) Int. Cl.
G06F 3/0484 (2022.01)
G06F 3/0482 (2013.01)
(Continued)

(52) U.S. Cl.
CPC .......... *G06F 3/0484* (2013.01); *G06F 3/0482* (2013.01); *G06F 16/176* (2019.01); *G06F 21/6209* (2013.01); *G06F 40/134* (2020.01)

(58) Field of Classification Search
CPC .... G06F 3/0484; G06F 3/0482; G06F 16/176; G06F 21/6209; G06F 40/134
See application file for complete search history.

(56) References Cited

U.S. PATENT DOCUMENTS

| 11,243,824 B1 * | 2/2022 | Meersma | G06F 16/176 |
| 2010/0083135 A1 * | 4/2010 | Zawacki | H04L 12/1822 715/753 |

(Continued)

*Primary Examiner* — Cao H Nguyen

(57) ABSTRACT

In non-limiting examples of the present disclosure, systems, methods, and devices for interacting with sharable dynamic objects are presented. A sharable dynamic object comprising a source file for a component may be accessed. A distributed data structure corresponding to the component may be generated. The component may be rendered in a host software application by processing the distributed data structure. An interactive control element may be rendered in the component, wherein the interactive control element comprises: a component location portion populated with identities of a plurality of distributed host experiences the component is included in, a component embedding portion populated with identities of a plurality of sharable objects that are selectable for automatically embedding the component in, and a copy component portion selectable for copying a link to the source file for the component.

20 Claims, 12 Drawing Sheets

Related U.S. Application Data

(60) Provisional application No. 63/274,170, filed on Nov. 1, 2021.

(51) Int. Cl.
*G06F 16/176* (2019.01)
*G06F 21/62* (2013.01)
*G06F 40/134* (2020.01)

(56) References Cited

U.S. PATENT DOCUMENTS

| | | | |
|---|---|---|---|
| 2015/0143211 A1* | 5/2015 | Kaufthal | G06F 40/166 715/205 |
| 2022/0334693 A1* | 10/2022 | De Vries | G06F 40/58 |

* cited by examiner

INTERACTIVE USER INTERFACE CONTROLS FOR SHARED DYNAMIC OBJECTS

RELATED APPLICATIONS

This application is a continuation of and claims priority to and the benefit of U.S. patent application Ser. No. 17/674,625, filed Feb. 17, 2022, titled "INTERACTIVE USER INTERFACE CONTROLS FOR SHARED DYNAMIC OBJECTS," which claims the benefit of and priority to U.S. Provisional Patent Application Ser. No. 63/274,170, filed on Nov. 1, 2021, titled "INTERACTIVE USER INTERFACE CONTROLS FOR SHARED DYNAMIC OBJECTS," each of which are expressly incorporated by reference herein in their entireties for all purposes.

BACKGROUND

With the increase in remote school and work users are increasingly turning to collaborative experiences that are enabled by computing devices and network connections. Users may communicate and collaborate with one another via collaborative experiences such as electronic meeting applications, chat applications, and shared documents. Users typically must move between these different collaborative experiences when working on collaborative projects. Additionally, while users can copy and paste or take screenshots of portions of a first collaborative experience for pasting or inserting into a second collaborative experience, those portions typically remain static once pasted or inserted.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods, and devices for interacting with sharable dynamic objects via novel interactive user interface controls. According to a first example, a computer-implemented method for interacting with sharable dynamic objects is provided. The computer-implemented method comprises: accessing a sharable dynamic object comprising a source file for a component; generating a distributed data structure corresponding to the component; rendering, by processing the distributed data structure, the component in a host software application; rendering an interactive control element in the component, wherein the interactive control element comprises: a component location portion populated with identities of a plurality of distributed host experiences the component is included in, wherein each of the identities of the plurality of distributed host experiences is selectable for automatically opening the component in a corresponding host experience, a component embedding portion populated with identities of a plurality of sharable objects that are selectable for automatically embedding the component in, and a copy component portion selectable for copying a link to the source file for the component.

In another example a system for interacting with sharable dynamic objects is provided. The system comprises: a memory for storing executable program code; and a processor, functionally coupled to the memory, the processor being responsive to computer-executable instructions contained in the program code and operative to: access a sharable dynamic object comprising a source file for a component; generate a distributed data structure corresponding to the component; render, by processing the distributed data structure, the component in a host software application; render an interactive control element in the component, wherein the interactive control element comprises: a component location portion populated with identities of a plurality of distributed host experiences the component is included in, wherein each of the identities of the plurality of distributed host experiences is selectable for automatically opening the component in a corresponding host experience, a component embedding portion populated with identities of a plurality of sharable objects that are selectable for automatically embedding the component in, and a copy component portion selectable for copying a link to the source file for the component.

In another example, a computer-readable storage device is provided. The computer-readable storage device comprises executable instructions that, when executed by a processor, assists with interacting with sharable dynamic objects, the computer-readable storage device including instructions executable by the processor for: accessing a sharable dynamic object comprising a source file for a component; generating a distributed data structure corresponding to the component; rendering, by processing the distributed data structure, the component in a host software application; rendering an interactive control element in the component, wherein the interactive control element comprises: a component location portion populated with identities of a plurality of distributed host experiences the component is included in, wherein each of the identities of the plurality of distributed host experiences is selectable for automatically opening the component in a corresponding host experience, a component embedding portion populated with identities of a plurality of sharable objects that are selectable for automatically embedding the component in, and a copy component portion selectable for copying a link to the source file for the component.

BRIEF DESCRIPTION OF THE DRAWINGS

Non-limiting and non-exhaustive examples are described with reference to the following figures.

DETAILED DESCRIPTION

Figure 1:
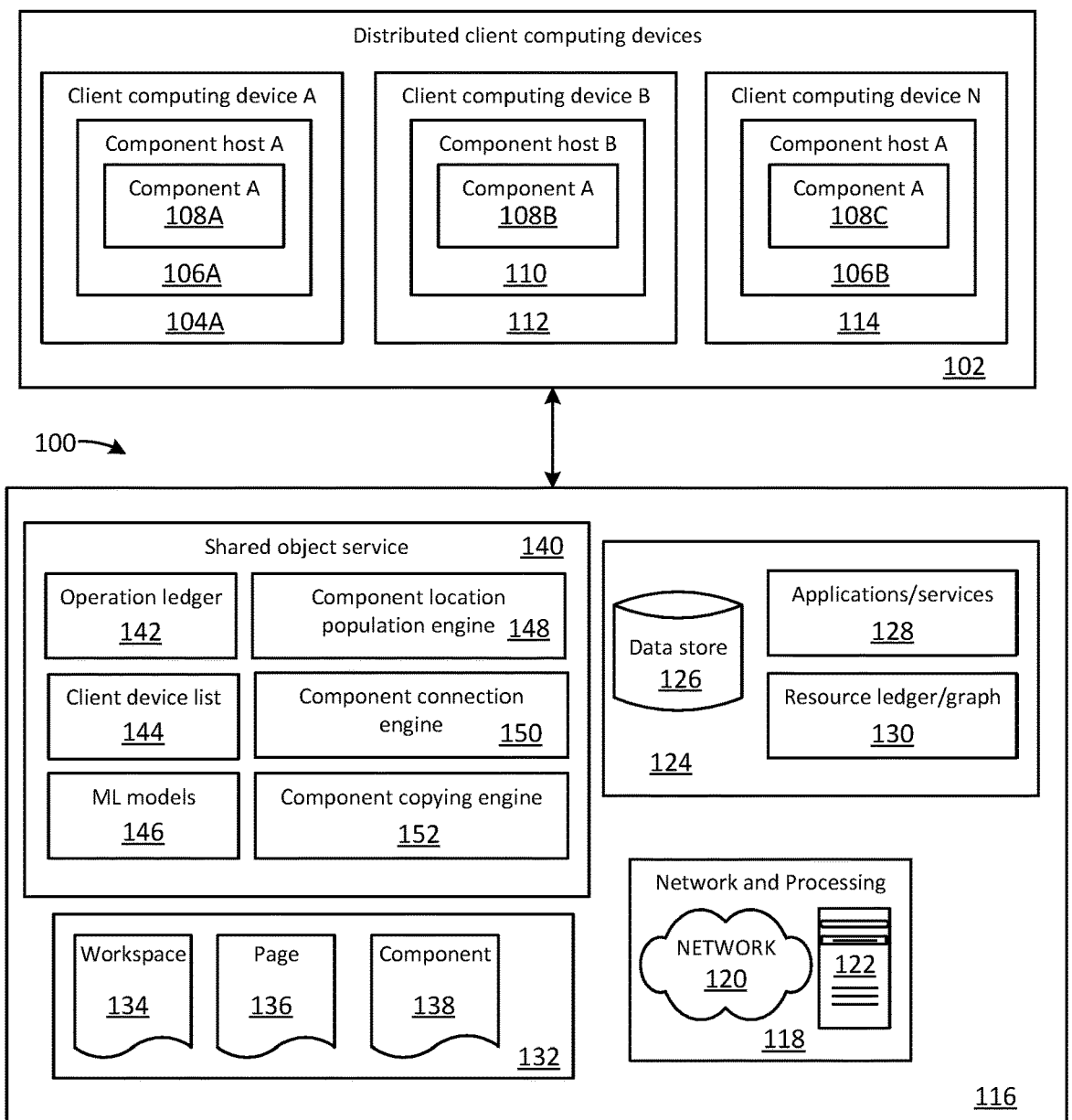
FIG. 1 is a schematic diagram illustrating an example distributed computing environment for interacting with sharable dynamic objects.
Figure 1:
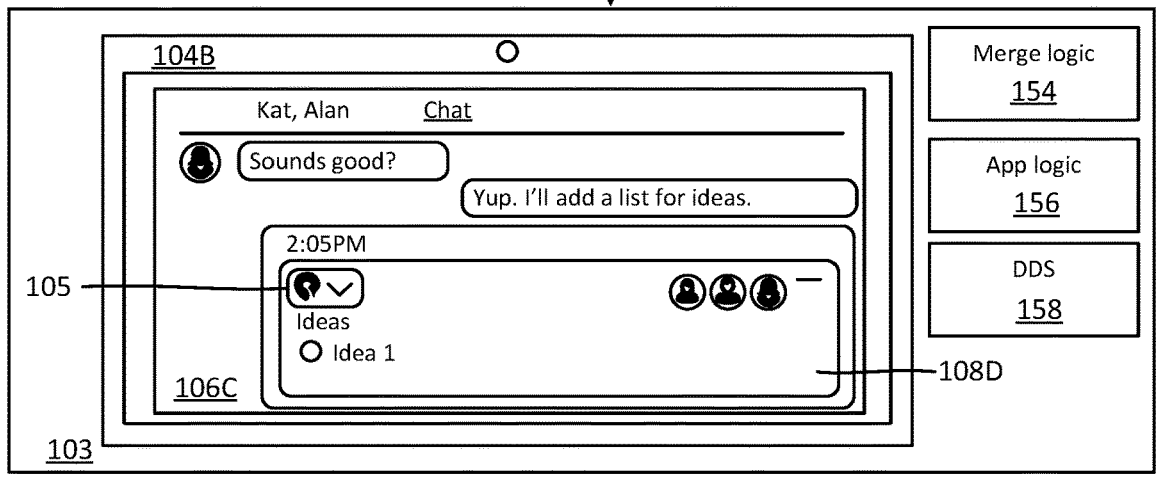

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Non-limiting examples of the present disclosure describe systems, methods, and devices for interacting with sharable dynamic objects via novel interactive user interface controls. A shared object service may be associated with a plurality of sharable dynamic objects. As described herein, a sharable dynamic object comprises an object that may be interacted with and/or edited by a plurality of client devices simultaneously and updated at each client device based on an order of operations reported to each client device by a cloud-based entity (e.g., the shared object service). The sharable dynamic objects may comprise workspaces, pages, components, and any combination of the same. As described herein, a component may comprise one or more sharable text strings, one or more sharable lists, one or more sharable polls, one or more sharable tables, one or more sharable agendas, one or more sharable bulleted lists, one or more sharable checklists, one or more sharable numbered lists, one or more sharable paragraphs, one or more sharable status trackers, one or more sharable task lists, one or more sharable voting tables, and/or one or more sharable images. As described herein, a page may comprise a sharable surface (e.g., a canvas, an application, a webpage) that includes one or more components. As described herein, a sharable workspace may comprise a sharable surface (e.g., a canvas, an application, a webpage) that includes one or more pages. A sharable workspace may include one or more organization panes and/or settings elements for navigating a workspace and modifying various elements associated with a workspace.

One or more user accounts or client computing devices may be provided with access to a sharable dynamic object associated with the shared object service. The sharable dynamic object may have originally been generated as a component or it may be transformed from a first object type (e.g., electronic document, electronic table, electronic poll, electronic image) to a component. In examples where the sharable object is originally generated as a component, a source object/file including that component may be generated and saved by the shared object service. Similarly, in examples where the sharable object is transformed from a first object type (e.g., electronic document, electronic table, electronic poll, electronic image) to a component, a source object/file including the component may be generated and saved by the shared object service. In examples where the shared object is originally generated in a page or a workspace, the page or the workspace may serve as the source of the component, and therefore a separate object/file need not necessarily be generated and saved by the shared object service because the originating object is already of a sharable dynamic object type.

Each client computing device that accesses a component may generate one or more distributed data structures corresponding to the component that are stored locally on the client computing device. Distributed data structures may be updated in real or near real-time as operations are reported to the local client devices that host the distributed data structures. Graphical user interfaces (GUIs) corresponding to the component and the distribute data structures may also be updated and changes to user interface elements may be rendered in real or near real-time based on operations reported to the local client devices by the shared object service.

To update and render changes associated with components in real-time on distributed client devices, the shared object service works in tandem with the distributed data structures hosted on the client devices. When an operation (e.g., a text entry, a text deletion, a font modification, a new column addition, a new row addition) is executed in association with a component, the client computing device that executed that operation sends data specifying the operation to the shared object service. The shared object service writes that data to an operation ledger. The shared object service also associates a timestamp with each incoming operation according to a time of execution and/or a time of operation data receipt by the shared object service. The shared object service notifies each connected client device (e.g., client devices that have the component open) of each logged operation. Each client device then renders the result of the component operations in real or near real-time based on the operational data reported by the shared object service. In some examples, the client devices and/or distributed data structures may employ optimistic merge logic comprising a last-writer-wins policy. In other examples, the client devices and/or distributed data structures may employ consensus merge logic that only allows a change to be made if it is accepted by other clients by a consensus process.

Examples of the present disclosure provide novel user interface controls for interacting with components. The interactive controls are accessible via user friendly user interface elements. The interactive controls may be accessible in stand-alone components, within pages that include components, within workspaces that include components, and within other surfaces (e.g., applications, widgets, operating system shell elements) that include component-supporting logic. The interactive user interface controls for a component may provide an indication of which other locations (e.g., documents, applications, chats) the component is included, which other users have access to the component, when the component was last updated, at which location the component was last updated, and who (e.g., which user account, which client device) last updated the component. These locational component elements may be interactive and link to or otherwise cause the locations to be navigated to and/or opened when accessed. In examples where a locational component element is interacted with and that locational component links to a page or a workspace, the interaction may cause the page or the workspace to be opened to the specific portion that includes the component.

In some examples, the interactive user interface controls may only surface a subset of locations that a component is included in. For example, a user account interacting with the interactive user controls for a component may only have permissions to view locations the component is included in based on one or more rules (e.g., account domain rules, organizational hierarchy rules, user whitelist rules, user blacklist rules, component content type, privacy rules, privacy settings). In additional examples, the shared object service may limit the locations that a user can view a component in. For example, users may be able to view some locations that a component is included in, but those locations may not be selectable for opening the experience (e.g., group chat, email, workspace) corresponding to that experience based on one or more rules or settings. For example, a user may be able to view, via the interactive user interface controls (or interactions with the interactive user interface controls) that a component is included in a chat application, but the user may not be able to view the chat and surrounding context around the component in that chat application, thus protecting the privacy of the users engaged in the chat.

The interactive user interface controls for a component may present locations (e.g., workspaces, pages, documents, chats, emails) that a user may wish to connect a component to. In some examples, these locations may be automatically identified via one or more rules (e.g., most recently accessed, last updated, commonly accessed), and/or via intelligent processing and application of one or more machine learning models to the locations and/or a component. The connection elements of the interactive user interface controls may be interacted with for automatically causing a component to be embedded in an interacted-with location identity element.

The interactive user interface controls for a component may include interactive elements for copying the component. According to some examples, a first interactive copy element may be selectable for automatically copying a link to a component such that when pasted in a secondary experience/surface/object the component is automatically embedded and hydrated in that secondary experience/surface/object. In additional examples, a second interactive copy element may be selectable for automatically copying a link to a component such that when pasted in a secondary experience/surface/object, the link may be inserted in the secondary experience/surface/object and be selectable for navigating a selecting user to the shared object (e.g., component source) corresponding to the component.

The systems, methods, and devices described herein provide technical advantages for interacting with sharable dynamic objects. Aspects described herein provide for interactive control elements that provide novel user interfaces for rendering identities of electronic surfaces where shareable dynamic objects are located and providing mechanisms for automatically open those locations in corresponding host experiences. In examples, the interactive control elements may be populated with identities of a plurality of sharable objects that are selectable for automatically embedding the component in. Aspects described herein provide for intelligent identification of the sharable objects for embedding components in via trained machine learning models, thereby providing automatically curated entities for inclusion in the interactive control elements. In additional examples, the interactive control elements described herein may include a copy component that is selectable for copying a link to a source file for a component.

FIG. 1 is a schematic diagram illustrating an example distributed computing environment 100 for interacting with sharable dynamic objects. Distributed computing environment 100 includes distributed client computing devices 102, cloud-based sub-environment 116, and interactive control element sub-environment 103.

Cloud-based sub-environment 116 includes network and processing sub-environment 118, sharable dynamic objects 132, application data sub-environment 124, and shared object service 140. Network and processing sub-environment 118 includes network 120 and server computing device 122. Any and all of the computing devices described herein may communicate with one another via a network, such as network 120. Server computing device 122 is illustrative of one or more server computing devices that may perform one or more of the operations described herein and/or store data described herein. Server computing device 122 is illustrative of one or more server computing devices that may execute, update, modify, delete, and/or store the ledgers, lists, models, and engines included in shared object service 140. Server computing device 122 and the distributed client computing devices 102 may communicate with one another via APIs, URIs, URLs, and/or other unique device or data source locators.

Shared object service 140 includes operation ledger 142, client device list 144, machine learning models 146, component location population engine 148, component connection engine 150, and component copying engine 152. Shared object service 140 may access one or more cloud-based documents associated with one or more applications or services (e.g., applications/services 128). Applications/services 128 is illustrative of one or more applications or services that may generate sharable dynamic objects that shared object service 140 may perform operations on or in association with. In some examples, the sharable dynamic objects that applications/services 128 may generate include objects of the file types illustrated in sharable dynamic objects 132 (e.g., workspace object 134, page object 136, component object 138). Workspace objects, page objects, and component objects may be generated via one or more of applications/services 128 as standalone objects. The components included in those objects may then be shared with one or more user accounts and/or client devices via one or more applications that include logic for hosting and updating dynamic object components. In additional examples, workspace objects, page objects, and component objects may be generated via user input associated with one or more non-dynamic objects. For example, a user may select or otherwise interact with text data, table data, or list data in a document, service, or application, and specify by that interaction that the data be transformed to a component, included in a page, or included in a workspace, and a new dynamic component object/file, page object/file, and/or workspace object/file may be generated and stored.

Applications/services 128 may also include one or more applications or services that do not necessarily generate sharable dynamic objects, but that include logic for hosting and updating sharable dynamic object components based on local and remote operations to those dynamic object components. In additional examples, applications/services 128 may include applications or services that do not necessarily include logic for hosting and updating sharable dynamic object components, such as one or more productivity applications and services. Examples of productivity applications or services that may or may not include logic for hosting and updating sharable dynamic object components based on local and remote operations to those sharable dynamic object components include meeting applications or services, chat applications or services, email applications or services, web browser applications or services, word processing applications or services, presentation applications or services, spreadsheet applications or services, notes applications or services, to-do applications or services, drawing applications or services, and software editing applications or services, among others.

Resources (e.g., objects, documents, content) generated or accessed by applications/services 128 may be stored in one or more data stores, such as data store 126. In some examples, user accounts may be associated with the resources that those user accounts generate and/or access via applications/services 128 and/or shared object service 140. The association may comprise tagging the resources with metadata including unique identifiers of the user accounts. In additional examples, resources and the user accounts that generated or accessed the resources may be stored in specific manners for handling various queries. This is illustrated by resource ledger/graph 130. In some examples, the resources and associated user accounts that generated or accessed those resources may be included in a data structure comprising a graphical matrix of nodes. Each node in a graphical matrix may comprise an identity of a resource and each node may include one or more attributes. Attributes may comprise user accounts that accessed or generated a resource, time of resource creation or editing, type of resource, and actions taken in association with resource. Nodes in a graphical matrix may be connected to one another via explicit or implicit edges. An explicit edge may comprise resource attachments, embedded links in resources, and/or objects embedded in resources. An implicit edge may comprise overlapping resource attributes and/or textual references to one or more other resources. Thus, queries associated with resources and user accounts may be processed by traversing one or more nodes and edges in the graphical matrix.

Shared object service 140 may receive data identifying operations that have been executed on components hosted by client devices (e.g., distributed client computing devices 102). The operation data from the client devices may be associated with times that the operations were executed, times the operations were sent from the client devices to shared object service 140, and/or times that shared object service 140 received the operation data. Shared object service 140 may store the identity of each operation that was executed on a component along with the temporal data, such that the operations may be ordered based on time of operation execution or receipt. Shared object service 140 includes client device list 144, which comprises identities of each client device that hosts a component. Client device list 144 may also comprise location data for each of those client devices and/or user accounts associated with those client devices. The location data may comprise URIs, URLs and/or other unique device identifiers.

When operations executed on or in association with a component are received and associated with execution/receipt times by shared object service 140, shared object service 140 sends the order of operations back to each client device that hosts the component. The component may then update a distributed data structure (e.g., distributed data structure 158) corresponding to the component based on processing of the operation data from the shared object service 140 with merge logic (e.g., merge logic 154) and application logic 156. The merge logic (e.g., merge logic 154) on each client device determines in which order to execute the operations. In some examples, for one or more components or component types, the client devices may employ optimistic merge logic comprising a last-writer-wins policy. In additional examples, for one or more components or component types, the client devices may employ consensus merge logic that only allows a change if it is accepted by other clients by a consensus process. The application logic (e.g., application logic 156) may perform operations in tandem with the merge logic (e.g., merge logic 154) for managing state information associated with distributed data structures and reflecting user edits and operations associated with sharable dynamic objects.

In this example, distributed client computing devices 102 includes client computing device A 104 (client computing device A 104A, client computing device A 104B), client computing device B 112, and client computing device N 114. Each of distributed client computing devices 102 hosts the same component 108 (component 108A, component 108B, component 108C, component 108D). However, client computing device A 104 and client computing device N 114 host component 108 in a first application type—component host A 106 (e.g., component host A 106A, component host B 106B), while client computing device B hosts component 108 in a second application type—component host B 110. In this specific example component host A 106 comprises a chat application or service and component host B 110 may comprise a different application or service type, such as an email application or service, a spreadsheet application or service, or a notes application or service, among others.

Component host A 106 is illustrated as chat application user interface 106 which is displayed by client computing device A 104B. Component 108 may have been added to the chat via one or more input mechanisms from component host A 106, component host B 110, and/or a different application or service (e.g., a sharable dynamic object application or service that generates stand-alone component files/objects, page files/objects, workspace files/objects). In this specific example, component 108D comprises a list object that everyone (e.g., Kat, Alan) in the chat has access to. However, other it should be understood that components may comprise other object types, including but not limited to: sharable text strings, one or more sharable lists, one or more sharable polls, one or more sharable tables, one or more sharable agendas, one or more sharable bulleted lists, one or more sharable checklists, one or more sharable numbered lists, one or more sharable paragraphs, one or more sharable status trackers, one or more sharable task lists, one or more sharable voting tables, and/or one or more sharable images. Regardless of its type, each component associated with shared object service 140 may be displayed in association with an interactive control icon, such as interactive control icon 105. Interactive control icons may be interacted with (e.g., via cursor hover, via touch input, via voice input, via mouse click, via trackpad input, via gesture input) for causing an interactive control element (e.g., interactive control element 206 discussed further in relation to FIG. 2) to be rendered and displayed in association with a corresponding component.

An interactive control element for a component may be hydrated with data by processing performed by one or more of component location population engine 148, component connection engine 150, and/or component copying engine 152. For example, component location population engine 148 may perform processing for rendering a component location portion of an interactive control element. A component location portion of an interactive control element may be populated with identities of one or more distributed host experiences a component is included in. In examples, one or more of the identities of one or more distributed host experiences may be selectable for automatically opening the component in a corresponding host experience. In some examples, one or more of identities of the distributed host experiences included in a component is included in may be displayed with an indication of their file type(s). In examples, host experiences included in a component location portion of an interactive control element may be identified by traversing a distributed graphical matrix comprised of a plurality of nodes connected by implicit and explicit edges as described above in relation to resource ledger/graph 130.

Component connection engine 150 may perform processing for rendering a component embedding portion of an interactive control element. An embedding portion of an interactive control element may be populated with identities of one or more sharable objects (e.g., workspaces, pages) that are selectable for automatically embedding a component in. In some examples, shared object service 140 may apply one or more machine learning models (e.g., machine learning models 146) to one or more resources associated with a user account to identify the sharable objects that are surfaced, displayed, and/or rendered in the embedding portion of the interactive control element. For example, machine learning models 146 may comprise one or more language machine learning models (e.g., transformer-based vector embedding models, neural networks, gated recurrent unit models, activation functions, K-nearest neighbor models, combinations of models) that have been trained to classify language into topical categories. Examples of transformer-based vector models that may be applied include BERT, ELMo, and BigBird. Thus, in some examples, content (e.g., text content, natural language content) included in a component may be topically classified via machine learning models 146, content (e.g., text content, natural language content) included in one or more other resources (e.g., workspaces, pages, shared documents, application canvases that know how to hydrate components) may be topically classified via machine learning models 146, and one or more match scores may be calculated based on those classifications. In examples, if a match score between a resource and a component is determined to be above a threshold value, the resource may be included as one of the identities of sharable objects in the embedding portion of the interactive control element. In additional examples, resources may be ranked based on their match scores and one or more top-ranked resources may be included in the identities of sharable objects in the embedding portion of the interactive control element. In other examples, the identities of sharable objects in the embedding portion of the interactive control element may be included based on one or more rules (e.g., most recently accessed, most recently updated).

Component copying engine 152 may perform processing for rendering a copy component portion of an interactive control element. A copy component portion of an interactive control element may be selectable for copying a link to a source file/object for a component (e.g., component object 138, page object 136, workspace object 134). In some examples, a copy component portion of an interactive control element may include a copy element that is selectable for automatically copying a link to a component such that when pasted in a secondary experience/surface/object the component is automatically embedded and hydrated with data in that secondary experience/surface/object. In additional examples, a copy component portion of an interactive control element may include a copy element that is selectable for automatically copying a link to a component such that when pasted in a secondary experience/surface/object, the link may be inserted in the secondary experience/ surface/object and be selectable for navigating a selecting user (e.g., the selecting user's web browser, an application accessed by the selecting user) to the shared object (e.g., component source, sharable dynamic object corresponding to the component) corresponding to the component.

Figure 2:
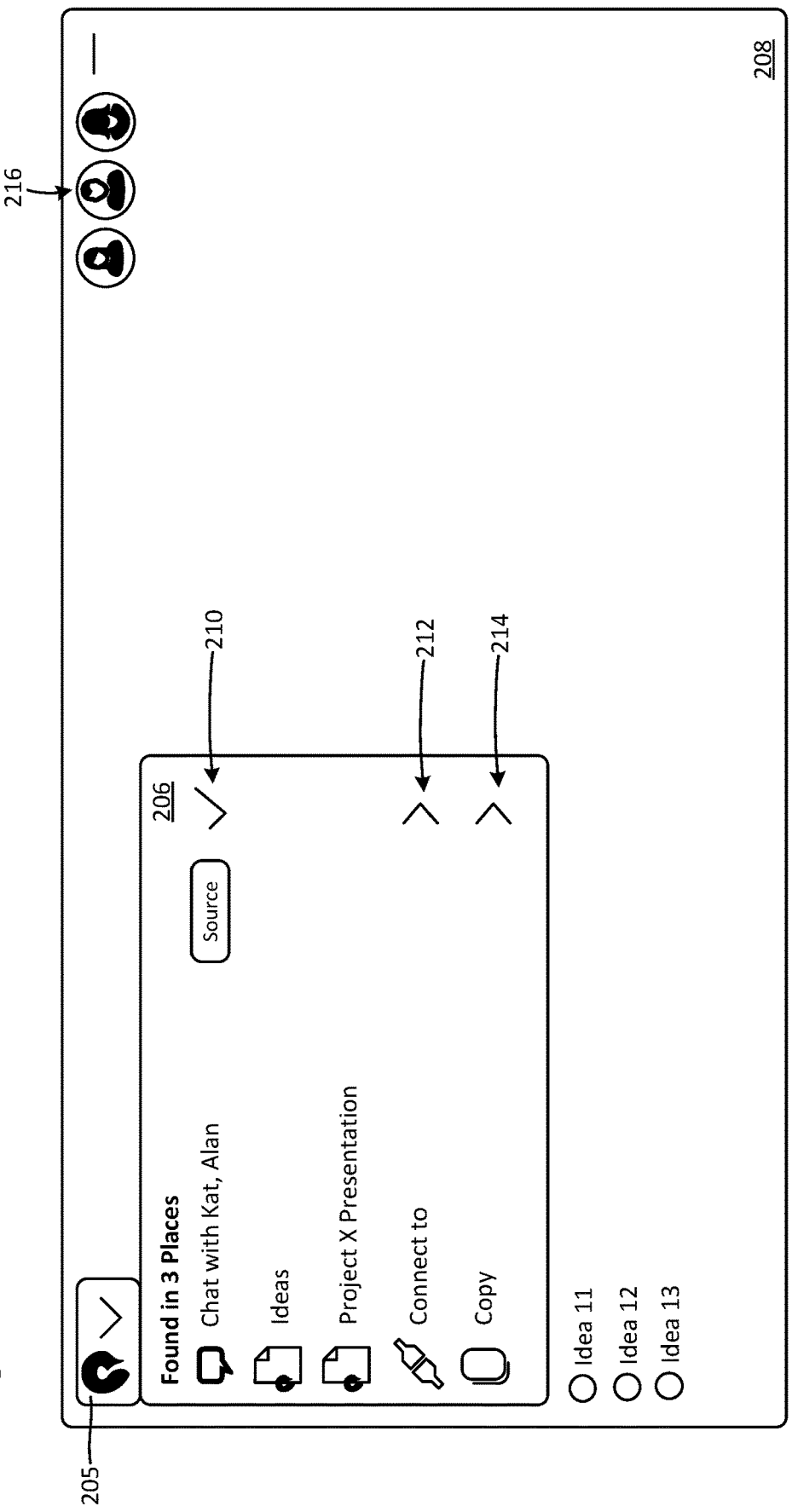
FIG. 2 is an exemplary user interface of a component and an interactive control element in the component.

FIG. 2 is an exemplary user interface of a component 208 and an interactive control element 206 in the component 208. The component includes user icons 216 corresponding to the user accounts that have access to component 208 or that are currently viewing component 208. Those users may have access or be currently viewing the component 208 in the same host software application or different host software applications. For example, two users (e.g., Kat and Alan) may be accessing the component via a chat application, and a third user may be accessing the component via a different type of application (e.g., an email application, a word processing application, a to-do application).

In this example, an interaction with interactive control icon 205 has been received, which causes interactive control element 206 to be rendered and displayed in association with component 208. Interactive control element comprises component location portion 210, which includes identities of a plurality of distributed host experiences the component is included in. The component location portion 210 in this example includes the text "Found in 3 places" with a first display element indicating that component 208 is included in a chat application or service instance that includes Kat and Alan, a second display element indicating that component 208 is included in a file with the title "Ideas" having a sharable dynamic object type (indicated by the icon on the document element), and a third display element indicating that component 208 is included in a file with the title "Project X Presentation" having a sharable dynamic object type (indicated by the icon on the document element). In examples, the locations where component 208 is located may be determined by querying one or more data structures, such as a graphical matrix of resources and/or resource ledger/graph 130.

In this example, component location portion 210 also includes an indication of which location is the "source" of component 208. In this example, the "source" is illustrated as being the application or service where the component was originally inserted/embedded. However, it should be understood that this is a designer choice, and the "source" element may be associated with the sharable dynamic file/object for component. In such examples, the source would be the "Ideas" file/object having the sharable dynamic object type because that file/object was automatically generated by shared object service 140 when component 208 was inserted/embedded in the application or service (e.g., the chat with Kat and Alan). One or more of the identities of the host experiences included in the component location portion 210 may be selectable by a user for automatically opening the corresponding host location and/or sharable dynamic object/file location. Whether a particular host experience is able to be opened by a user may be controlled by one or more rules (e.g., account domain rules, organizational hierarchy rules, user blacklist rules, user whitelist rules, component content type, privacy rules, privacy settings).

Figure 3:
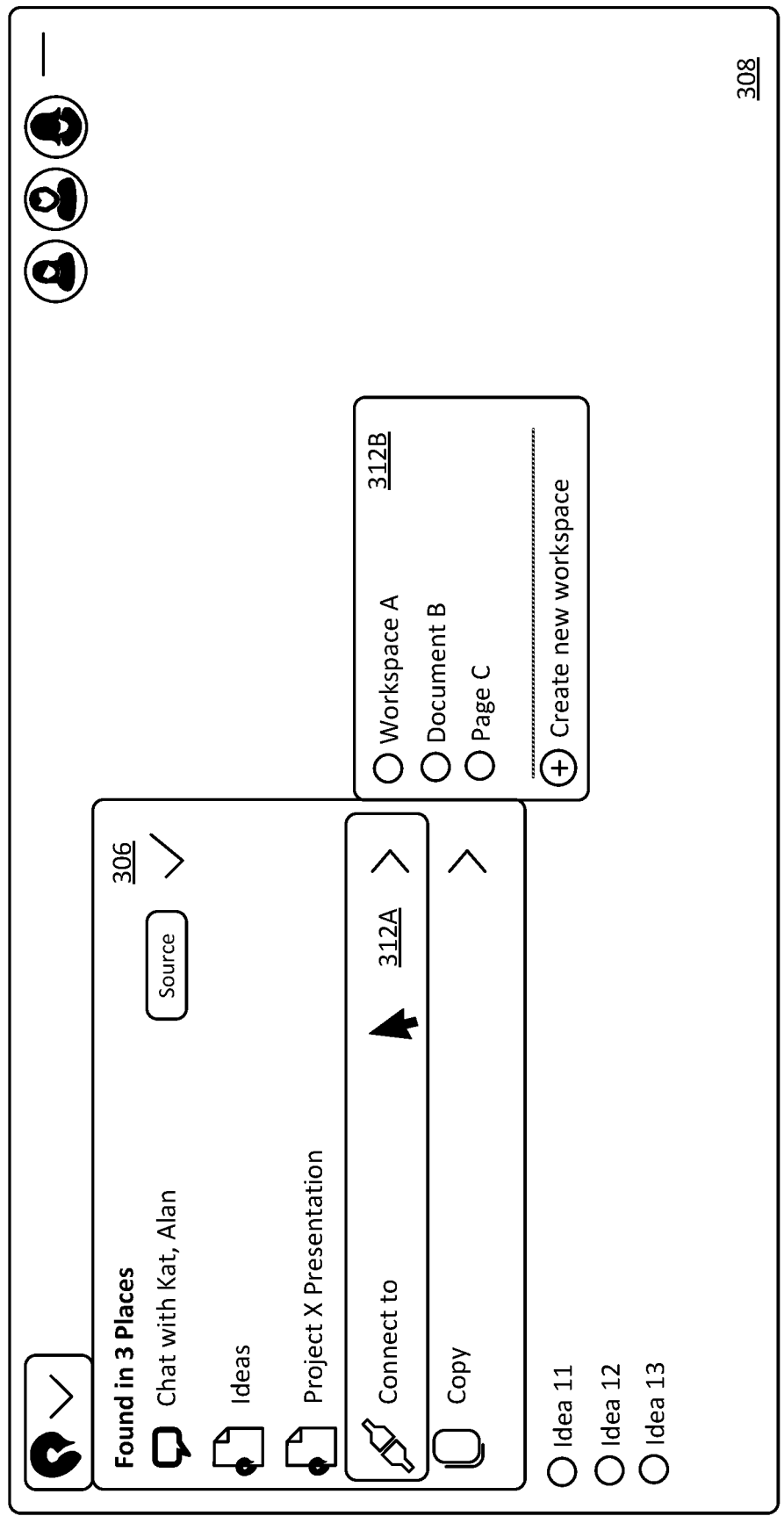
FIG. 3 is an exemplary user interface of a component and an interactive control element with an expanded component embedding portion.

Interactive control element further comprises component embedding portion 212, which if interacted with may cause population of identities of one or more sharable objects that are selectable for automatically embedding the component in as more fully illustrated and described in relation to FIG. 3.

Figure 4:
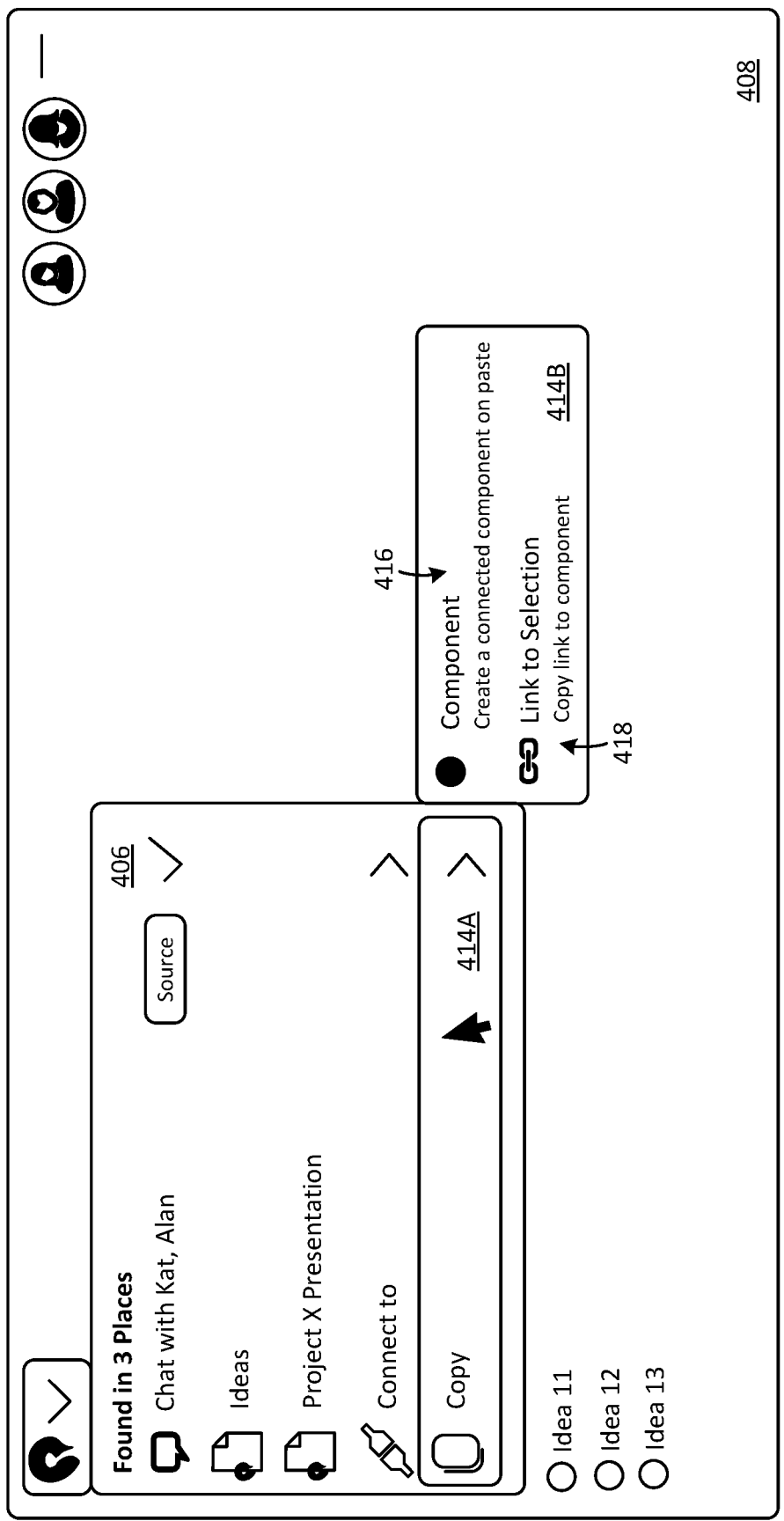
FIG. 4 is an exemplary user interface of a component and an interactive control element with an expanded copy component portion.

Interactive control element further comprises copy component portion 214, which when interacted with may cause one or more elements for copying a link to the sharable dynamic file/object (e.g., the "Ideas" sharable dynamic object) for component 208 to be surfaced, as more fully illustrated and described in relation to FIG. 4.

FIG. 3 is an exemplary user interface of a component 308 and an interactive control element 306 with an expanded component embedding portion 312. In this example, an interaction has been received in a first portion of a menu corresponding to component embedding portion 312A. In examples, that interaction may comprise a mouse click, a mouse hover, a touch input, a voice input, and/or a gesture input. Based on receiving the input, a second user interface element (e.g., a window, a flyout pane, a dropdown list) is caused to be rendered and displayed. This second user interface element is illustrated as component embedding portion 312B. Thus, component embedding portion 312A and component embedding portion 312B alone or in combination may comprise a component embedding portion of an interactive control element.

Component embedding portion 312 is populated with identities of a plurality of objects that are selectable for automatically embedding component 308 in. In this specific example, those identities include a workspace (e.g., "Workspace A"), a document (e.g., "Document B"), and a page (e.g., "Page C"). Component embedding portion 312 also includes an interactive element for creating a new workspace. If interacted with, a new sharable dynamic object comprising a workspace file/object type may be generated by the sharable object service and embedding component 308 may be manually or automatically embedded in the new workspace.

FIG. 4 is an exemplary user interface of a component 408 and an interactive control element 406 with an expanded copy component portion 414. In this example, an interaction has been received in a first portion of a menu corresponding to copy component portion 414A. In examples, that interaction may comprise a mouse click, a mouse hover, a touch input, a voice input, and/or a gesture input. Based on receiving the input, a second user interface element (e.g., a window, a flout pane, dropdown list) is caused to be rendered and displayed. This second user interface element is illustrated as copy component portion 414B. Thus, copy component portion 414A and copy component portion 414B alone or in combination may comprise a copy component portion of an interactive control element.

Copy component portion 414 is populated with two different elements for copying a link to the source file for component 408. A first copy element 416, which includes the text "component—create a connected component on paste" may be selectable for automatically copying a link to component 408 and/or the sharable dynamic object/file corresponding to component 408 such that when pasted in a secondary experience/surface/host the component 408 is automatically embedded and hydrated with data in that secondary experience/surface. A second copy element 418, which includes the text "link to selection—copy link to component" may be selectable for automatically copying a link to component 408 and/or the sharable dynamic object/file corresponding to component 408 such that when pasted in a secondary experience/surface/host, the link may be inserted in the secondary experience/surface/host and be selectable for navigating a selecting user (e.g., via web browser, via application) to the sharable dynamic object/file (e.g., component source) corresponding to the component 408. In some examples, that source may be the originating application or service where the component 408 was initially embedded/inserted (e.g., in this case the chat application or service). In other examples, that source may be the sharable dynamic object that was generated when the component was embedded/inserted (e.g., in this case the "Ideas" file/object).

Figure 5:
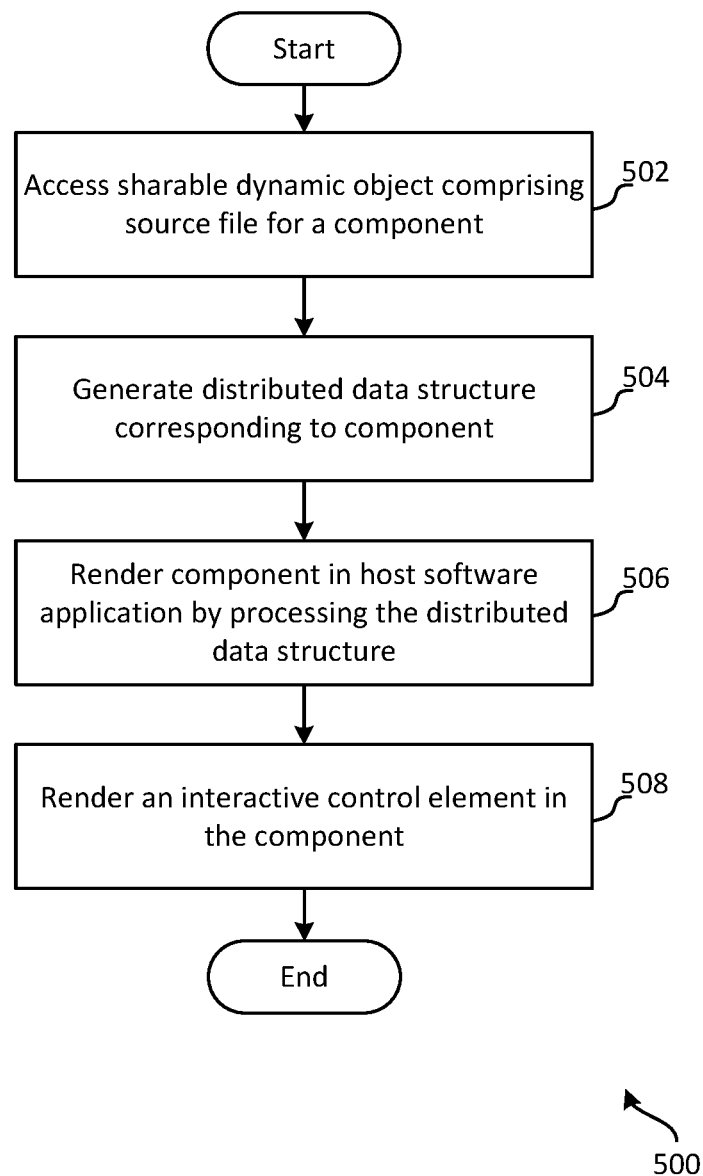
FIG. 5 is an exemplary method for interacting with sharable dynamic objects.

FIG. 5 is an exemplary method 500 for interacting with sharable dynamic objects. The method 500 begins at a start operation and flow moves to operation 502.

At operation 502 a sharable dynamic object comprising a source file for a component is accessed. In examples, the source file may comprise a page or a workspace. A page may comprise a sharable surface that includes one or more components. A workspace may comprise a sharable surface that includes one or more pages. The component may comprise one or more sharable text strings, one or more sharable agendas, one or more sharable bulleted lists, one or more checklists, one or more sharable numbered lists, one or more sharable paragraphs, one or more sharable status trackers, one or more sharable task lists, one or more sharable voting tables, and/or one or more sharable images. The sharable dynamic object may be accessed via a software application or service. The software application or service may be associated with a page or workspace that the component is included in and/or the software application or service may comprise a software application or service that the component is embedded in. The sharable dynamic object may have originally been generated as a component or it may be transformed from a first object type to a component.

From operation 502 flow continues to operation 504 where a distributed data structure corresponding to the component is generated. The distributed data structure comprises at least one cloud-based operation ledger that logs operations executed in association with the component as well as times of execution of those operations. Each local computing device that accesses the component may generate a distributed data structure corresponding to the component. Each local copy of the distributed data structure may be updated in real or near real-time as operations are reported to the local computing devices from the operation ledger. When an operation is executed in association with a component, the client computing device that executed that operation sends data specifying the operation to the shared object service. The shared object service writes that data to the operation ledger. The shared object service also associates a timestamp with each incoming operation according to a time of execution and/or a time of operation data receipt by the shared object service. The shared object service notifies each connected client device of each logged operation.

From operation 504 flow continues to operation 506 where the component is rendered in a host software application by processing the distributed data structure corresponding to the component. Each client computing device associated with the component may render the result of operations reported by the operation ledger in real or near real-time. In some examples, the client devices and/or distributed data structures may employ optimistic merge logic comprising a last-writer wins policy. In other examples, the client devices and/or distributed data structures may employ consensus merge logic that only allows a change to be made if it is accepted by other clients by a consensus process.

From operation 506 flow continues to operation 508 where an interactive control element is rendered in the component. In some examples, the interactive control element need not necessarily be rendered in the component. For example, the interactive control element may be rendered on a canvas that includes the component, but the interactive control element may be rendered outside of the component or in a different window all together.

In examples, the interactive control element may comprise a component location portion populated with identities of a plurality of distributed host experiences the component is included in, wherein each of the identities of the plurality of distributed host experiences is selectable for automatically opening the component in a corresponding host experience. In examples, the host experience included in a component location portion of an interactive control element may be identified by traversing a distributed graphical matrix comprised of a plurality of nodes connected by implicit and explicit edges.

In additional examples, the interactive control element may further comprise a component embedding portion populated with identities of a plurality of sharable objects that are selectable for automatically embedding the component in. In some examples, the shared object service may apply one or more machine learning models to one or more resources associated with a user account to identify the sharable objects that are surfaced, displayed, and/or rendered in the embedding portion of the interactive control element. Thus, in some examples, content (e.g., text content, natural language content) included in a component may be topically classified via machine learning models, content included in one or more resources may be topically classified via machine learning models, and one or more match scores may be calculated based on those classifications. In examples, if a match score between a resource and a component is determined to be above a threshold value, the resource may be included as one of the identities of sharable objects in the embedding portion of the interactive control element. In additional examples, resources may be ranked based on their match scores and one or more top-ranked resources may be included in the identities of sharable objects in the embedding portion of the interactive control element. In other examples, the identities of sharable objects in the embedding portion of the interactive control element may be included based on one or more rules (e.g., most recently accessed, most recently updated).

In still additional examples, the interactive control element may comprise a copy component portion selectable for copying a link to the source file for the component. In some examples, the copy component portion may include a copy element that is selectable for automatically copying a link to the component such that when pasted in a secondary experience/surface/object the component is automatically embedded and hydrated with data in that secondary experience/surface/object. In additional examples, the copy component portion may include a copy element that is selectable for automatically copying a link to the component such that when pasted in a secondary experience/surface/object, the link may be inserted in the secondary experience/surface/object and be selectable for navigating a selecting user (e.g., the selecting user's web browser, an application accessed by the selecting user) to the shared object (e.g., the component source, sharable dynamic object corresponding to the component) corresponding to the component.

From operation 508 flow moves to an end operation and the method 500 ends.

Figure 6A:
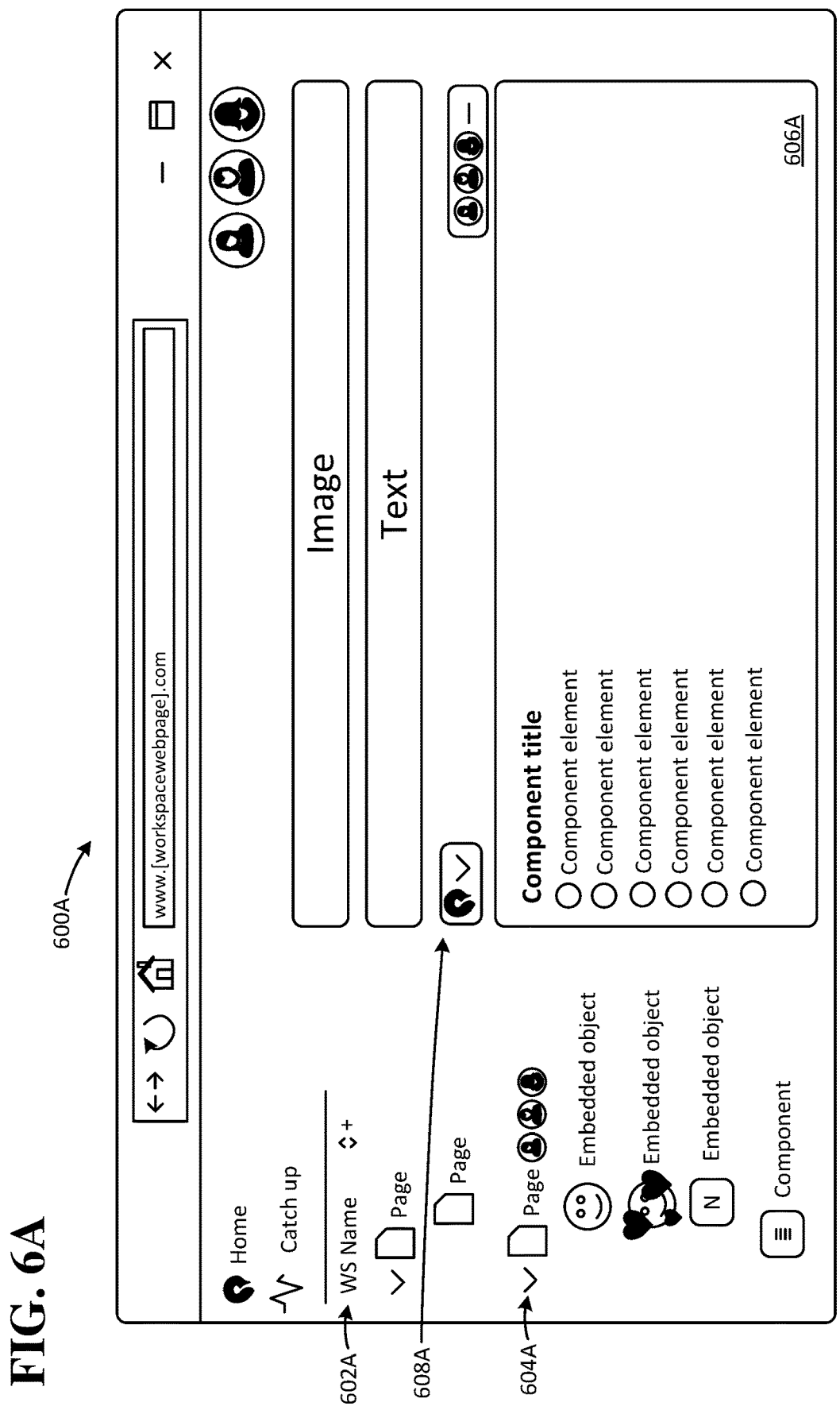
FIG. 6A is an exemplary user interface of a workspace including a component that may be interacted with via an interactive control element.

FIG. 6A is an exemplary user interface of a workspace 600A including a component 606A that may be interacted with via an interactive control element 608A. In this example, workspace 600A is accessed via a web browser. In other examples a workspace may be accessed from a workspace application. Workspace 600A includes navigation pane 602A, which includes selectable user interface elements for a plurality of pages included in workspace 600A. A user interface element for a page may be selectable for navigating to the corresponding page in a workspace. Workspace 600A also includes selectable user interface elements for objects and components embedded in pages of workspace 600A. Those elements may be selectable for navigating to the corresponding objects and/or components in workspace 600A.

Figure 6B:
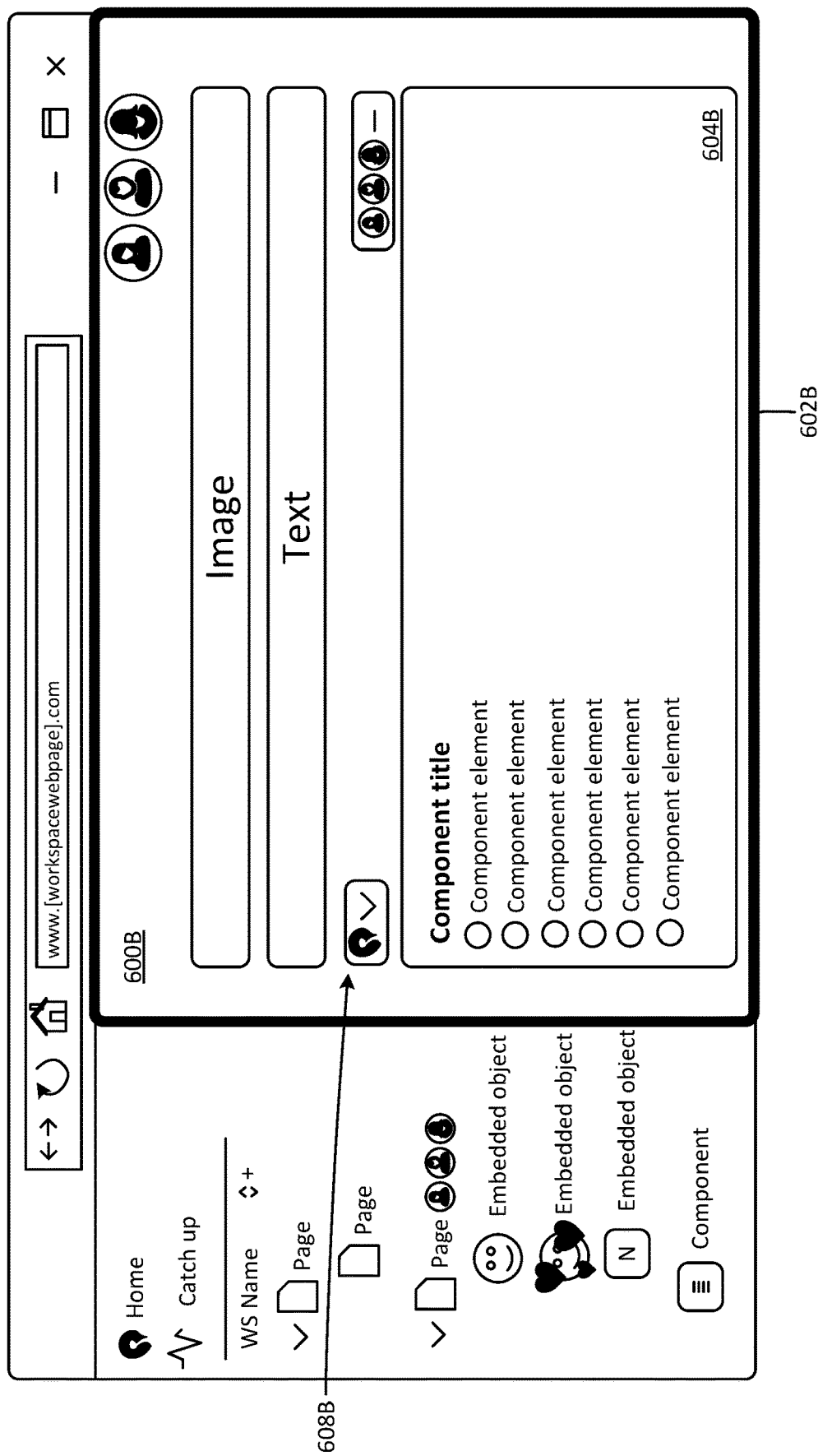
FIG. 6B is an exemplary user interface of a page that includes a component that may be interacted with via an exemplary interactive control element.

FIG. 6B is an exemplary user interface of a page 600B that includes a component 604B that may be interacted with via an exemplary interactive control element 608B. The page 600B is included in a workspace. The page 600B comprises the content included inside box 602B, but not the content outside of box 602B. A page such as page 600B may comprise images, text, components, and other embedded objects.

Figure 6C:
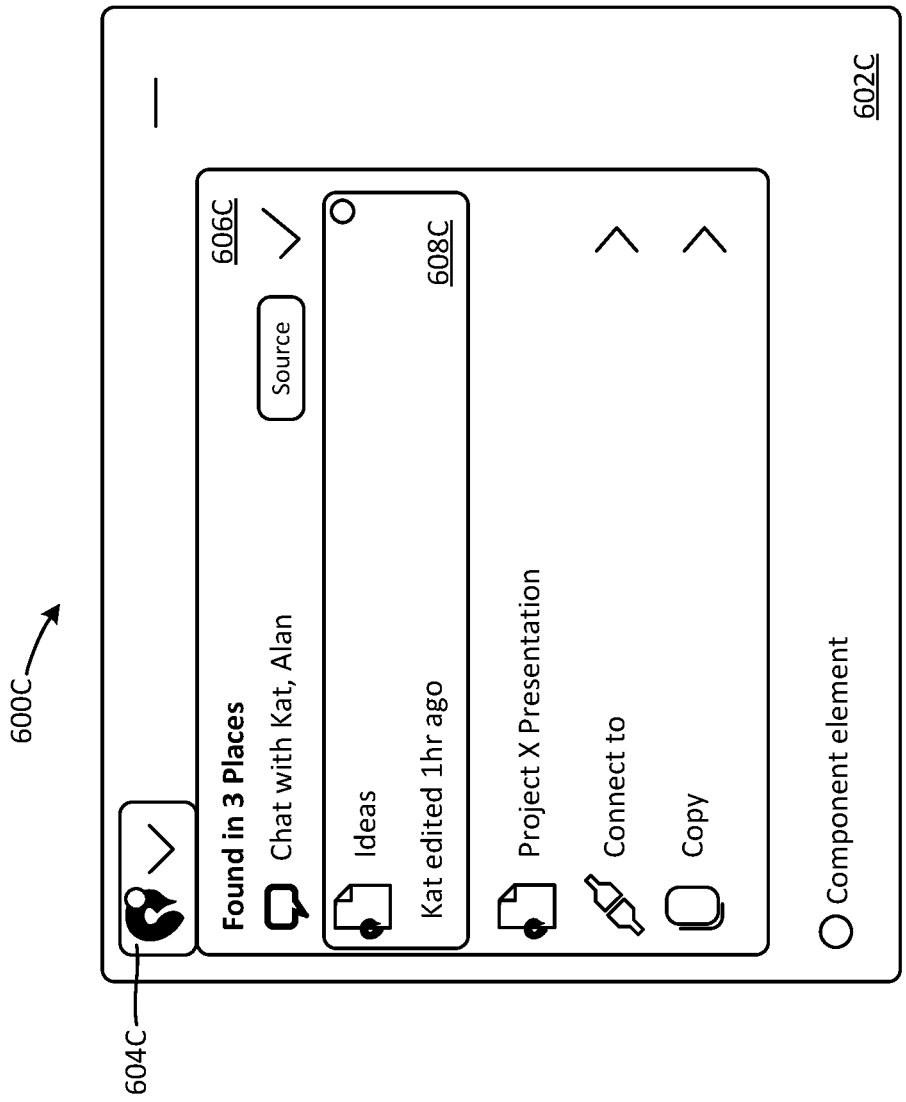
FIG. 6C is an exemplary user interface of an interactive control element that includes elements indicating that a corresponding component has been modified.

FIG. 6C is an exemplary user interface of an interactive control element 604C that includes elements indicating that a corresponding component 602C has been modified. Specifically, interactive control element 604C includes a bubble icon on it indicating that a user has modified the content of component 602C. A user has interacted with interactive control element 604C, which causes interactive control element 604C to expand to expanded interactive control element 606C. Expanded interactive control element 606C includes a component location portion, a component embedding portion, and a copy component portion. A second one 608C of the distributed host experiences (e.g., the "Ideas" document) included in the component location portion of expanded interactive control element 606C includes an indication of which user last modified component 602C at that location, as well as an approximate time that component 602C was modified by that user at that location. Specifically, the second one 608C of the distributed host experiences includes the text "Kat edited 1 hr ago".

Figure 7:
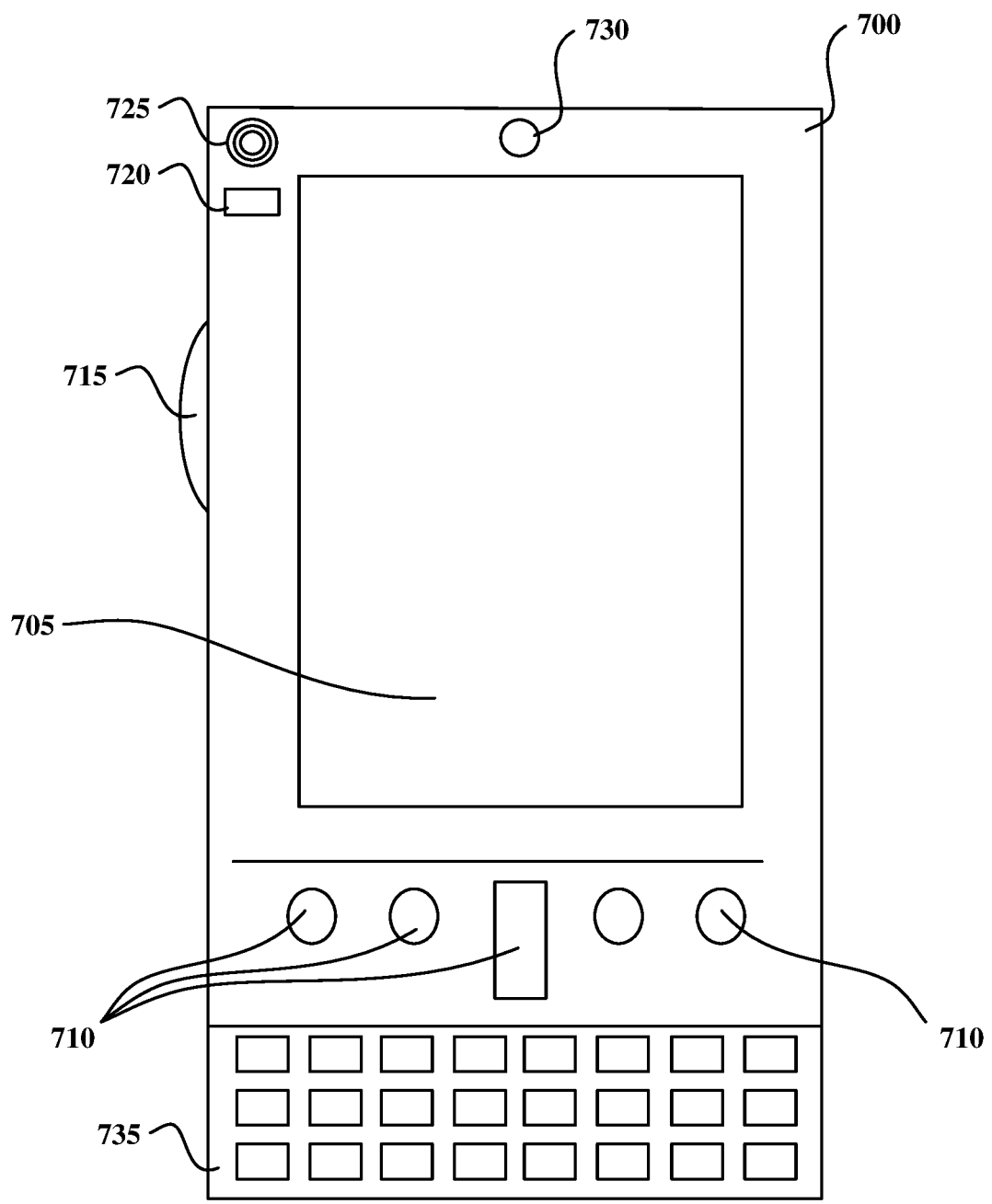
FIGS. 7 and 8 are simplified diagrams of a mobile computing device with which aspects of the disclosure may be practiced.
Figure 8:
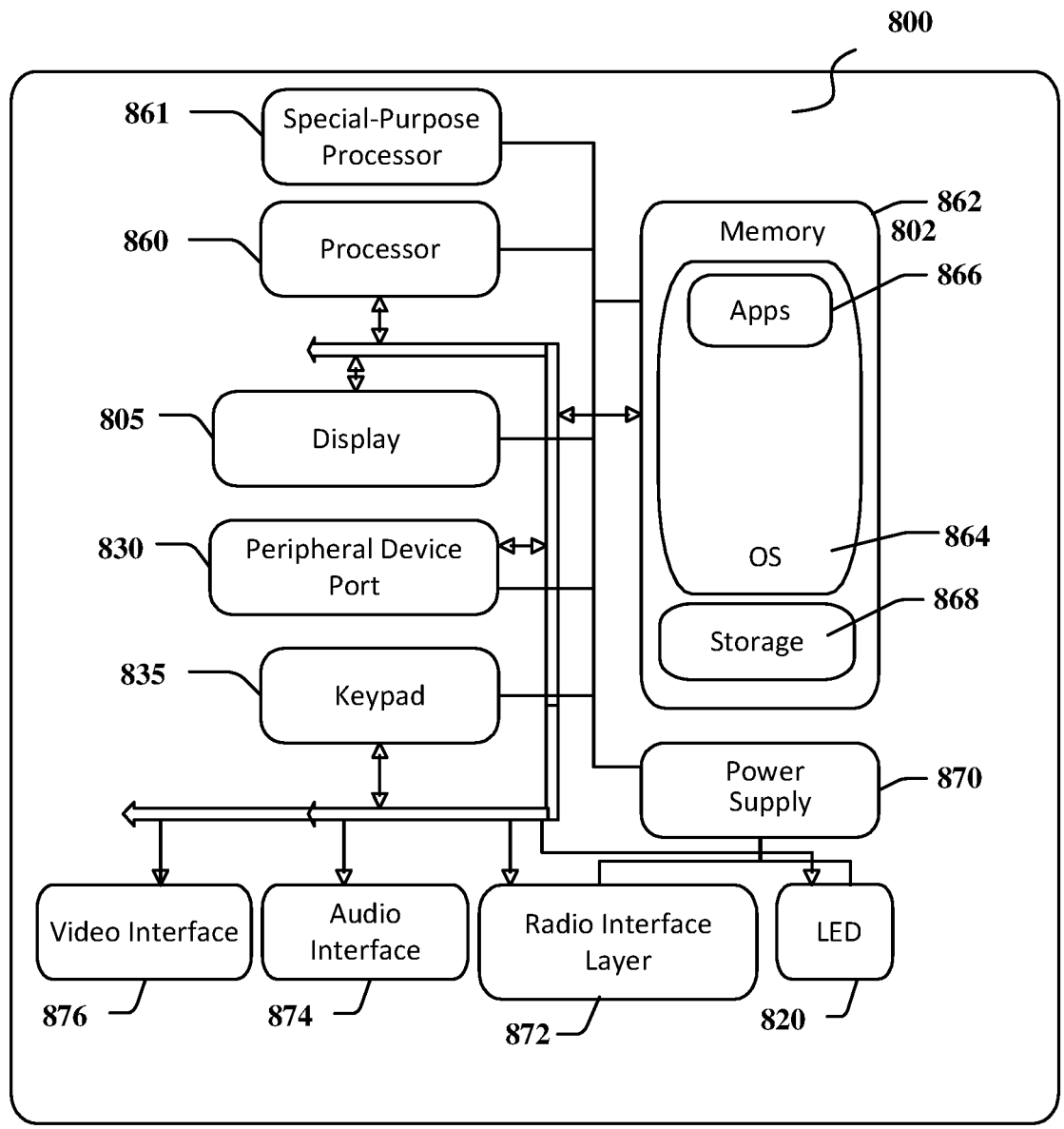

FIGS. 7 and 8 illustrate a mobile computing device 700, for example, a mobile telephone, a smart phone, wearable computer, a tablet computer, an e-reader, a laptop computer, and an augmented reality computer, with which embodiments of the disclosure may be practiced. With reference to FIG. 7, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705, 805 of the mobile computing device 700 may also function as an input device (e.g., a touch screen display). If included, an optional side input element 715 allows further user input. The side input element 715 may be a rotary switch, a button, or any other type of manual input element. In alternative aspects, mobile computing device 700 may incorporate more or fewer input elements. For example, the display 705 may not be a touch screen in some embodiments. In yet another alternative embodiment, the mobile computing device 700 is a portable phone system, such as a cellular phone. The mobile computing device 700 may also include an optional keypad 735, 835. Optional keypad 735 may be a physical keypad or a "soft" keypad generated on the touch screen display. In various embodiments, the output elements include the display 705 for showing a graphical user interface (GUI), a visual indicator 620 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports (e.g., peripheral device port 830), such as an audio input (e.g., a microphone jack), an audio output (e.g., a headphone jack), and a video output (e.g., a HDMI port) for sending signals to or receiving signals from an external device.

FIG. 8 is a block diagram illustrating the architecture of one aspect of a mobile computing device. That is, the mobile computing device 800 can incorporate a system (e.g., an architecture) 802 to implement some aspects. In one embodiment, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800, including instructions for identifying a target value in a data set.

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 720 may be used to provide visual notifications, and/or an audio interface 874 may be used for producing audible notifications via the audio transducer 725. In the illustrated embodiment, the visual indicator 720 is a light emitting diode (LED) and the audio transducer 725 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 725, the audio interface 874 may also be coupled to a microphone to receive audible input, such as to facilitate a telephone conversation. In accordance with embodiments of the present disclosure, the microphone may also serve as an audio sensor to facilitate control of notifications, as will be described below. The system 802 may further include a video interface 876 that enables an operation of an on-board camera 730 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8 by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated, such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

Figure 9:
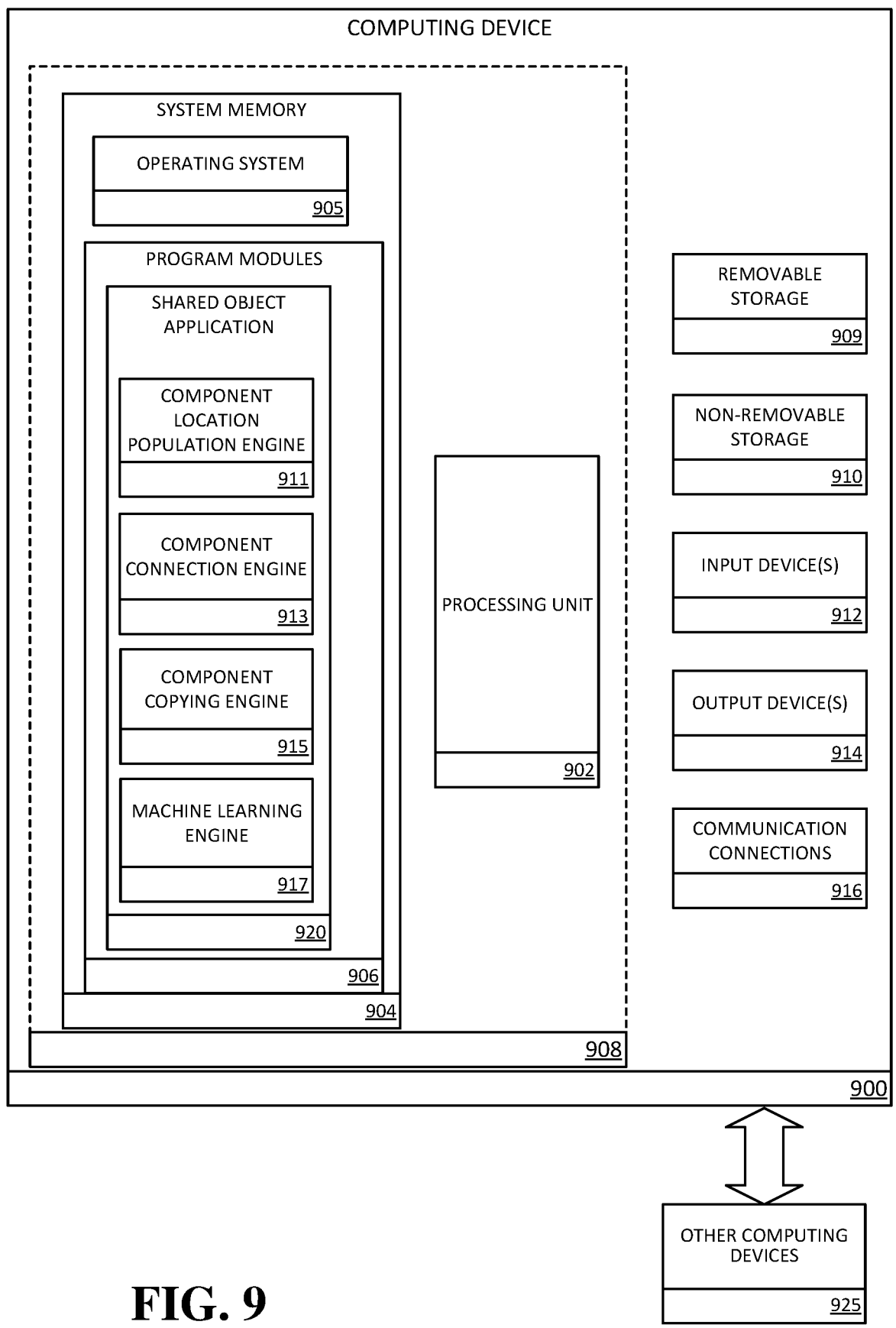
FIG. 9 is a block diagram illustrating example physical components of a computing device with which aspects of the disclosure may be practiced.

FIG. 9 is a block diagram illustrating physical components (e.g., hardware) of a computing device 900 with which aspects of the disclosure may be practiced. The computing device components described below may have computer executable instructions for interacting with sharable dynamic objects via interactive user interface controls. In a basic configuration, the computing device 900 may include at least one processing unit 902 and a system memory 904. Depending on the configuration and type of computing device, the system memory 904 may comprise, but is not limited to, volatile storage (e.g., random access memory), non-volatile storage (e.g., read-only memory), flash memory, or any combination of such memories. The system memory 904 may include an operating system 905 suitable for running one or more productivity application programs. The operating system 905, for example, may be suitable for controlling the operation of the computing device 900. Furthermore, embodiments of the disclosure may be practiced in conjunction with a graphics library, other operating systems, or any other application program and is not limited to any particular application or system. This basic configuration is illustrated in FIG. 9 by those components within a dashed line 908. The computing device 900 may have additional features or functionality. For example, the computing device 900 may also include additional data storage devices (removable and/or non-removable) such as, for example, magnetic disks, optical disks, or tape. Such additional storage is illustrated in FIG. 9 by a removable storage device 909 and a non-removable storage device 910.

As stated above, a number of program modules and data files may be stored in the system memory 904. While executing on the processing unit 902, the program modules 906 (e.g., shared object application 920) may perform processes including, but not limited to, the aspects, as described herein. According to examples, component location population engine 911 may perform one or more operations for rendering a component location portion of an interactive control element. Component connection engine 913 may perform one or more operations for rendering a component embedding portion of an interactive control element. Component copying engine 915 may perform one or more operations for rendering a copy component portion of an interactive control element. Machine learning engine 917 may perform one or more operations for processing text, image, or audio data with machine learning models that have been trained to classify data into topical categories.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 900 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 900 may also have one or more input device(s) 912 such as a keyboard, a mouse, a pen, a sound or voice input device, a touch or swipe input device, etc. The output device(s) 914 such as a display, speakers, a printer, etc. may also be included. The aforementioned devices are examples and others may be used. The computing device 900 may include one or more communication connections 916 allowing communications with other computing devices 925. Examples of suitable communication connections 916 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 904, the removable storage device 909, and the non-removable storage device 910 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 900. Any such computer storage media may be part of the computing device 900. Computer storage media does not include transitory media (e.g., a carrier wave or other propagated or modulated data signal). Computer storage device does not include transitory media (e.g., a carrier wave or other propagated or modulated data signal). Computer-readable storage device does not include transitory media (e.g., a carrier wave or other propagated or modulated data signal).

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 10:
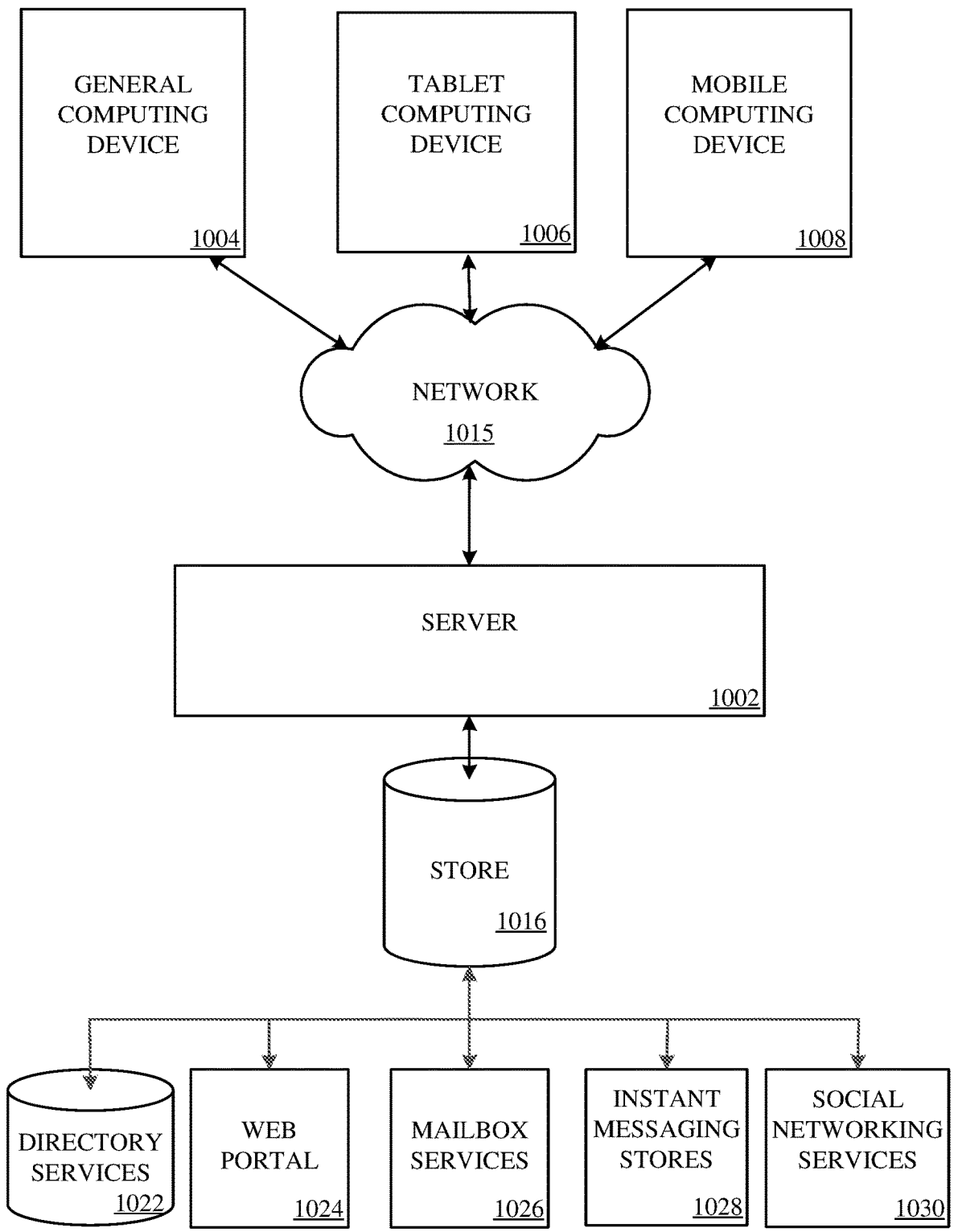
FIG. 10 is a simplified block diagram of a distributed computing system in which aspects of the present disclosure may be practiced.

FIG. 10 illustrates one aspect of the architecture of a system for processing data received at a computing system from a remote source, such as a personal/general computer 1004, tablet computing device 1006, or mobile computing device 1008, as described above. Content displayed at server device 1002 may be stored in different communication channels or other storage types. For example, various documents may be stored using a directory service 1022, a web portal 1024, a mailbox service 1026, an instant messaging store 1028, or a social networking site 1030. The program modules may be employed by a client that communicates with server device 1002, and/or the program modules may be employed by server device 1002. The server device 1002 may provide data to and from a client computing device such as a personal/general computer 1004, a tablet computing device 1006 and/or a mobile computing device 1008 (e.g., a smart phone) through a network 1015. By way of example, the computer system described above with respect to FIGS. 7-9 may be embodied in a personal/general computer 1004, a tablet computing device 1006 and/or a mobile computing device 1008 (e.g., a smart phone). Any of these embodiments of the computing devices may obtain content from the store 1016, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method, comprising:
accessing a sharable dynamic object comprising a source file for a component;
generating a distributed data structure corresponding to the component;
identifying each of a plurality of distributed host experiences the component is included in by traversing a distributed graphical matrix comprised of a plurality of nodes connected by implicit and explicit edges; and
rendering, by processing the distributed data structure, the component and an interactive control element in a host software application, wherein the interactive control element comprises user interface elements for accessing information about the component in the plurality of distributed host experiences.

2. The computer-implemented method of claim 1, wherein the distributed data structure comprises at least one cloud-based operation ledger that logs operations executed in association with the component and including a timestamp indicating a time of execution of the operations.

3. The computer-implemented method of claim 1, wherein the user interface elements comprise a component location element populated with identities of the plurality of distributed host experiences the component is included in, wherein each of the identities of the plurality of distributed host experiences is selectable for automatically opening the component in a corresponding host experience.

4. The computer-implemented method of claim 1, wherein the user interface elements comprise a copy component element selectable for copying a link to the source file for the component.

5. The computer-implemented method of claim 1, wherein the user interface elements comprise a component embedding element populated with identities of a plurality of shareable objects that are selectable for automatically embedding the component in.

6. The computer-implemented method of claim 5, wherein the plurality of sharable objects comprise one or more saved workspaces having a same file type as the source file for the component, one or more saved pages having the same file type as the source file for the component, or a combination thereof.

7. The computer-implemented method of claim 5, wherein one or more of the plurality of sharable objects that are selectable for automatically embedding the component in are identified via application of a language machine learning model trained to classify language by type and to match language from one source to language in another source.

8. The computer-implemented method of claim 5, wherein one of the plurality of sharable objects that is selectable for automatically embedding the component in is identified via application of a transformer-based vector embedding model to content included in the component, and application of the transformer-based vector embedding model to content included in the sharable object.

9. The computer-implemented method of claim 1, wherein the explicit edges comprise resource attachments, embedded links in resources, and objects embedded in resources.

10. The computer-implemented method of claim 1, wherein the implicit edges comprise overlapping resource attributes and textual references to one or more resources.

11. The computer-implemented method of claim 1, wherein each of the identities of the plurality of distributed host experiences the component is included in is displayed with an indication of its file type.

12. The computer-implemented method of claim 1, further comprising:
receiving an indication that a user has modified content included in the component from a remote device;
receive, from a remote shared object service, an order of operations including at least one operation corresponding to the modification of the content from the remote device;
applying merge logic to the order of operations; and
updating rendering of the content based on application of the merge logic.

13. The computer-implemented method of claim 12, wherein the content is modified from a different type of host software application than a type of the host software application.

14. The computer-implemented method of claim 12, further comprising:
displaying, in association with the interactive control element, a generic indication that content included in the component has been modified;
receiving a selection of the interactive control element; and
displaying an identity of the user that modified the content included in the component.

15. The computer-implemented method of claim 14, wherein the indication includes a time of modification as reported by the remote shared object service.

16. A system, comprising:
a memory for storing executable program code; and
a processor, functionally coupled to the memory, the processor being responsive to computer-executable instructions contained in the program code and operative to:
access a sharable dynamic object comprising a source file for a component;
generate a distributed data structure corresponding to the component;
identify each of a plurality of distributed host experiences the component is included in by traversing a distributed graphical matrix comprised of a plurality of nodes connected by implicit and explicit edges; and
render, by processing the distributed data structure, the component and an interactive control element in a host software application, wherein the interactive control element comprises user interface elements for accessing information about the component in the plurality of distributed host experiences.

17. The system of claim 16, wherein the user interface elements comprise:
a component location element populated with identities of the plurality of distributed host experiences the component is included in, wherein each of the identities of the plurality of distributed host experiences is selectable for automatically opening the component in a corresponding host experience;
a component embedding element populated with identities of a plurality of sharable objects that are selectable for automatically embedding the component in; and
a copy component element selectable for copying a link to the source file for the component.

18. The system of claim 17, wherein the processor is responsive to further computer-executable instructions contained in the program code and operative to:
receive a selection of one of the identities of the plurality of distributed host experiences the component is included in;
determine that a user account associated with the selection has permissions to view the selected host experience; and
automatically open the component in the selected host experience.

19. The system of claim 17, wherein the processor is responsive to further computer-executable instructions contained in the program code and operative to:
receive a selection of one of the sharable objects;
open a shared workspace corresponding to the selected sharable object; and
embed the component in the shared workspace corresponding to the selected sharable object.

20. The system of claim 17, wherein the processor is responsive to further computer-executable instructions contained in the program code and operative to:
receive a selection of the copy component element;
generate a link that that identifies a specific location of the source file for the component;
receive a paste operation in a different host software application; and
embed the component as a dynamic object in the different host software application.

* * * * *